United States Patent
Kochery et al.

(10) Patent No.: US 9,848,383 B2
(45) Date of Patent: Dec. 19, 2017

(54) ARRANGEMENT FOR, AND METHOD OF, CONSERVING BATTERY POWER IN A BLUETOOTH LOW ENERGY BEACON

(71) Applicant: SYMBOL TECHNOLOGIES, LLC, Lincolnshire, IL (US)

(72) Inventors: Davis Kochery, Karnataka (IN); Jeelan Basha Poola, Karnataka (IN); Varun Tandon, Karnataka (IN)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/884,854

(22) Filed: Oct. 16, 2015

(65) Prior Publication Data
US 2017/0111863 A1 Apr. 20, 2017

(51) Int. Cl.
H04B 7/00 (2006.01)
H04W 52/02 (2009.01)
H04W 4/00 (2009.01)
H04W 8/00 (2009.01)

(52) U.S. Cl.
CPC ....... *H04W 52/0229* (2013.01); *H04W 4/008* (2013.01); *H04W 8/005* (2013.01)

(58) Field of Classification Search
CPC .............. H04W 52/0245; H04W 4/008; G07C 9/00007
USPC .............................................. 455/41.1, 41.2
See application file for complete search history.

(56) References Cited

U.S. PATENT DOCUMENTS

| | | | |
|---|---|---|---|
| 2002/0097182 A1* | 7/2002 | Goren | G01S 1/026 342/357.4 |
| 2003/0114204 A1* | 6/2003 | Allen | H04W 52/0225 455/574 |
| 2008/0112347 A1* | 5/2008 | Gossain | H04W 52/0229 370/311 |
| 2008/0136708 A1* | 6/2008 | Kim | H04W 52/16 342/367 |
| 2010/0157974 A1 | 6/2010 | Nichols et al. | |
| 2012/0258741 A1 | 10/2012 | Tillson et al. | |
| 2013/0065584 A1* | 3/2013 | Lyon | H04W 28/06 455/434 |
| 2013/0090061 A1* | 4/2013 | Linde | H04W 8/005 455/41.2 |
| 2014/0277654 A1 | 9/2014 | Reinhardt et al. | |

(Continued)

OTHER PUBLICATIONS

International Search Report and Written Opinion for International Patent Application No. PCT/US2016/055679 dated Dec. 21, 2016.

*Primary Examiner* — Raj Chakraborty (57) ABSTRACT

A Bluetooth low energy (BLE) beacon in a BLE network is electrically powered by a battery, broadcasts messages, and listens for a network communication indicative of whether a mobile device is present in a venue. A beacon controller controls the beacon to periodically broadcast the messages and to periodically listen for the network communication during an active mode of operation, to not broadcast the messages to conserve power from the battery and to listen for the network communication during a power save mode of operation, and to switch from the power save mode to the active mode when the network communication received during the power save mode indicates that a mobile device is present in the venue.

18 Claims, 4 Drawing Sheets

(56) References Cited

U.S. PATENT DOCUMENTS

| | | | |
|---|---|---|---|
| 2015/0163748 A1* | 6/2015 | Hrabak | H04W 52/0245 455/41.2 |
| 2015/0271737 A1 | 9/2015 | Shin et al. | |
| 2016/0048835 A1* | 2/2016 | Mutha | G06Q 20/325 705/44 |
| 2016/0055690 A1* | 2/2016 | Raina | G07C 9/00007 340/5.61 |
| 2016/0081019 A1* | 3/2016 | Pujari | H04W 4/008 370/311 |

* cited by examiner

ARRANGEMENT FOR, AND METHOD OF, CONSERVING BATTERY POWER IN A BLUETOOTH LOW ENERGY BEACON

BACKGROUND OF THE INVENTION

The present disclosure relates generally to an arrangement for, and a method of, conserving electrical power in a Bluetooth low energy (BLE) network and, more particularly, to conserving battery power in a BLE beacon to increase the working lifetime of the battery.

Bluetooth is a known local area networking wireless technology standard for exchanging data over relatively short distances using radio frequency (RF) waves in the 2.4 GHz ISM band. A Bluetooth-enabled device has a software-implemented, Bluetooth stack that supports various native Bluetooth versions, e.g., Version 4.0, also known as Bluetooth low energy (BLE), which is designed to consume very little electrical power. A BLE device, which is known as a BLE beacon, transmits or broadcasts a message, e.g., a unique identifier (ID), to a Bluetooth-enabled, wireless mobile device, such as a smartphone, a tablet, a personal digital assistant, a media player, a radio, a headset, a laptop, a printer, a modem, a smartwatch, a pair of glasses, and a like mobile device. One or more BLE beacons may be deployed in a network that includes a beacon manager and a network controller. Each such mobile device processes the message transmitted by the BLE beacon to perform various functions, e.g., to determine the physical location of the mobile device relative to the BLE beacon in a venue with a high or fine degree of precision, e.g., from a few meters down to a few centimeters, and/or to precisely track movement of the mobile device in the venue, and/or to perform one or more actions or services when the mobile device is in close proximity with, or within one or more predetermined ranges of distances relative to, the BLE beacon. A typical example of a location-based action in mobile commerce is to advertise or offer a special deal for goods on a consumer's smartphone as the consumer walks about in a retail store in which BLE beacons are deployed.

The BLE beacon is configured in various form factors and, although it may be powered by various power sources, it is typically powered by one or more coin cell batteries or cylindrical dry cell batteries, each of whose working lifetimes is limited. For example, an individual battery lifetime can typically range between 1-24 months depending upon such factors, among others, as how often the messages are transmitted (i.e., the transmission rate or frequency), the duration of each message (i.e., the transmission time), and the power level of each message transmission (i.e., the transmit power). Although the BLE beacon is designed for power efficiency to minimize battery power consumption, the known BLE beacon is typically always operating in an active mode, in which the BLE beacon, among other things, periodically transmits messages even when there are no mobile devices present in the venue to process the messages. Under these conditions, such periodic transmissions consume and waste electrical power and reduce the working lifetime of the battery, thereby leading to more frequent network downtimes and battery replacements, as well as to higher equipment and maintenance costs.

Accordingly, it would be desirable to conserve the battery's power, to replace the battery less frequently, to increase the battery's working lifetime, to decrease equipment and maintenance costs, and to more efficiently utilize the battery, in the BLE beacon.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this disclosure, an arrangement for conserving electrical power in a Bluetooth low energy (BLE) network, includes a BLE beacon electrically powered by a battery, and operative for broadcasting messages, and for listening for a network communication indicative of whether a mobile device is present in a venue. A beacon controller controls the beacon by broadcasting the messages and listening for the network communication during an active mode of operation, by not broadcasting the messages to conserve power from the battery and listening for the network communication during a power save mode of operation, and by switching from the power save mode to the active mode when the network communication received during the power save mode indicates that a mobile device is present in the venue.

The BLE beacon preferably has an energizable transmitter for periodically broadcasting the messages when energized, and an energizable receiver for periodically listening for, and receiving, the network communication. The beacon controller energizes both the transmitter and the receiver with the power supplied by the battery during the active mode, and does not energize the transmitter and only energizes the receiver during the power save mode. Advantageously, the power save mode is a default mode of operation. Preferably, the beacon controller automatically switches from the active mode to the power save mode when a predetermined condition has been met.

The received network communication may be received either directly from the mobile device, or from another BLE beacon in the network, or from an infrastructure device in the network. The infrastructure device, which advantageously may be an access point of the network, preferably continuously detects whether one or more mobile devices are present in the venue, and preferably periodically sends the network communication to the beacon.

In accordance with another feature of this disclosure, a method of conserving electrical power in a Bluetooth low energy (BLE) network is performed by electrically powering a BLE beacon with a battery, and by controlling the BLE beacon to operate in different modes of operation. During an active mode of operation, the BLE beacon broadcasts messages, and listens for a network communication indicative of whether a mobile device is present in a venue. During a power save mode of operation, the BLE beacon does not broadcast the messages to conserve power from the battery, and listens for the network communication. The operation of the BLE beacon switches from the power save mode to the active mode when the network communication received during the power save mode indicates that a mobile device is present in the venue.

Figure 1:
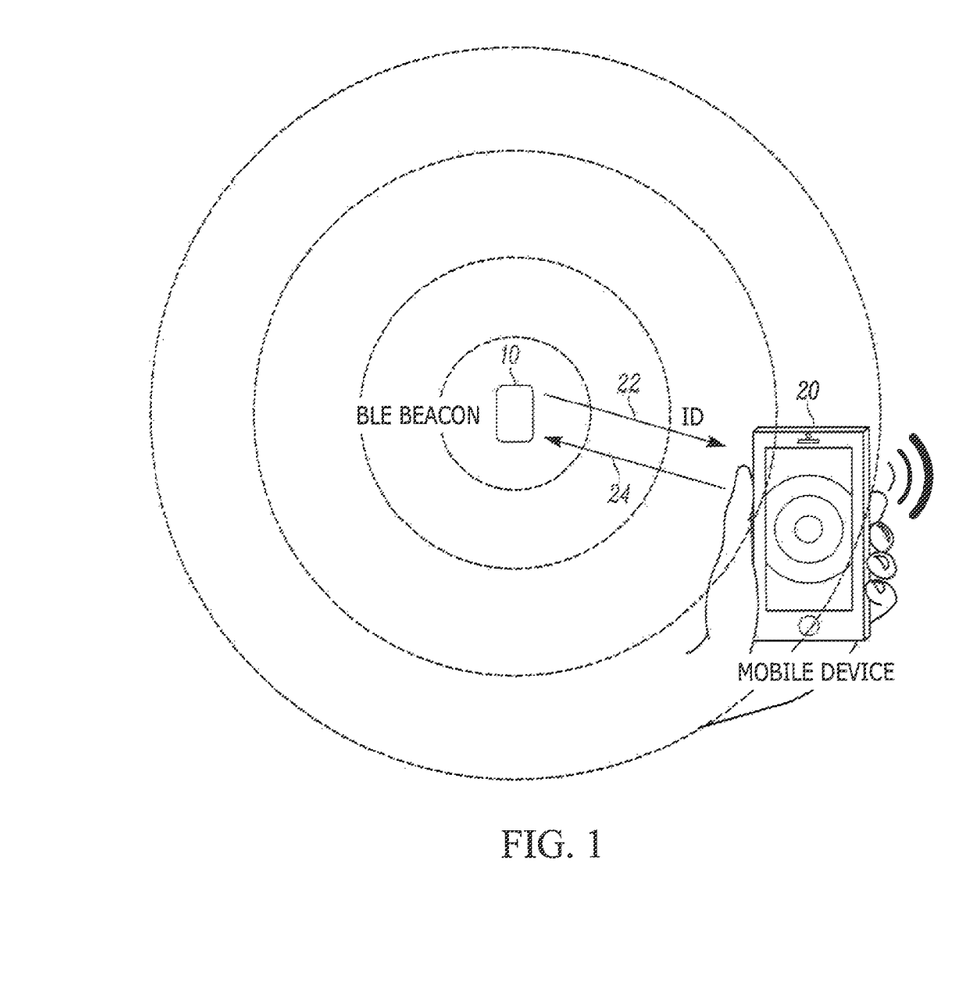
FIG. 1 is a diagrammatic view of one embodiment of an arrangement for conserving electrical power in a BLE beacon in accordance with this disclosure.
Figure 2:
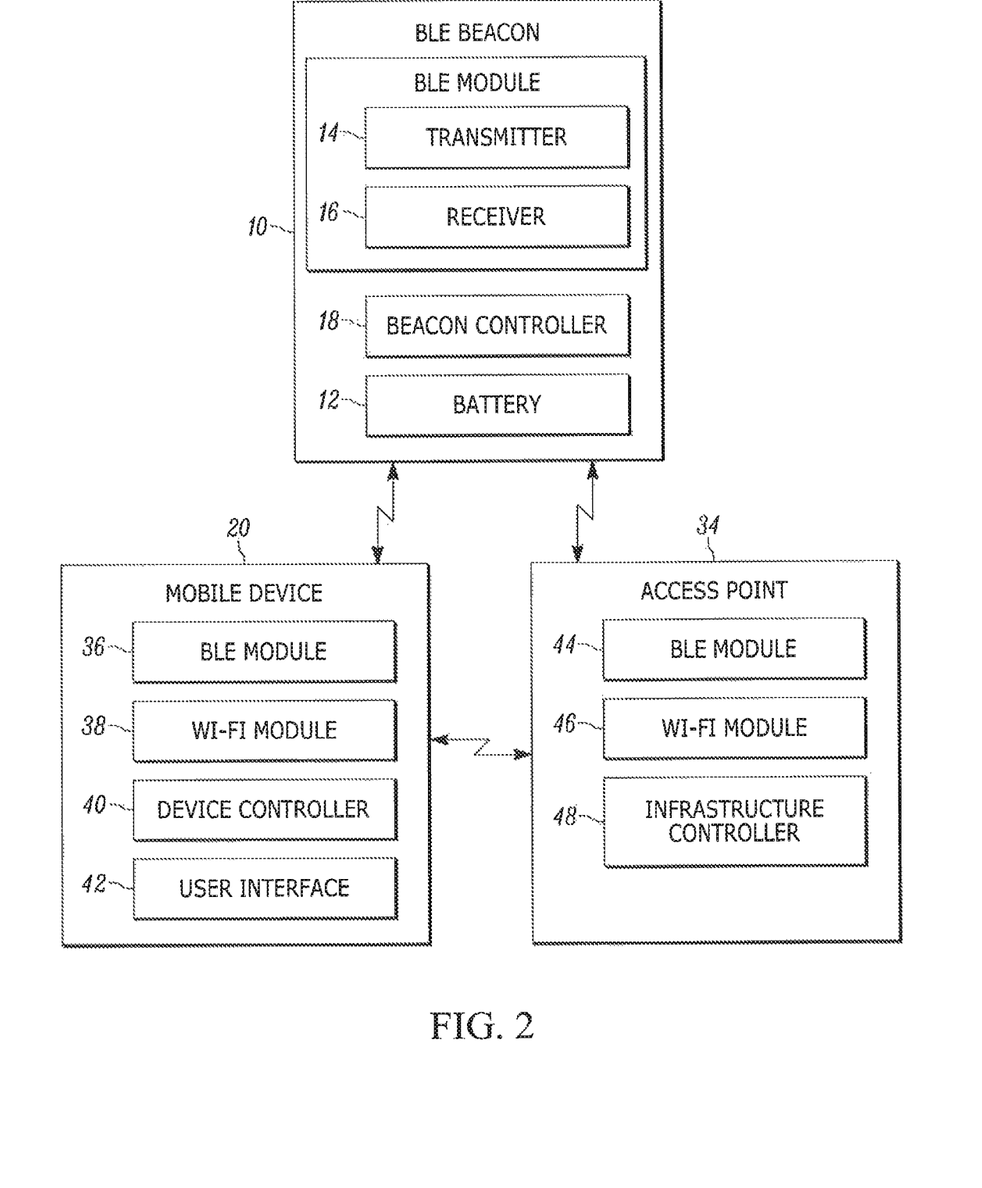
FIG. 2 is a schematic view of another embodiment of an arrangement for conserving electrical power in a BLE beacon in accordance with this disclosure.

Turning now to the drawings, reference numeral 10 in FIGS. 1-2 generally identifies a Bluetooth low energy (BLE) beacon electrically powered by at least one battery 12, typically a coin cell battery or a cylindrical dry cell battery (type AA). The beacon 10 includes a BLE module that has a transmitter 14 and a receiver 16, both powered by the battery 12, and both controlled by a programmed microprocessor or beacon controller 18. When powered, the transmitter 14 transmits or broadcasts a message, e.g., a unique identifier (ID), over a wireless BLE link 22, to a Bluetooth-enabled, wireless mobile device 20. Although the mobile device 20 in FIG. 1 has been illustrated as a smartphone, it will be understood that this is merely exemplary, and that many other types of mobile devices, such as tablets, personal digital assistants, media players, radios, headsets, laptops, printers, modems, smartwatches, pairs of glasses, and the like, are contemplated for use with the beacon 10 of this disclosure. The receiver 16 listens for, and receives over a wireless BLE link 24, a network communication indicative of whether the mobile device 20 is present in a venue, e.g., a retail store, a factory, a warehouse, etc.

Figure 3:
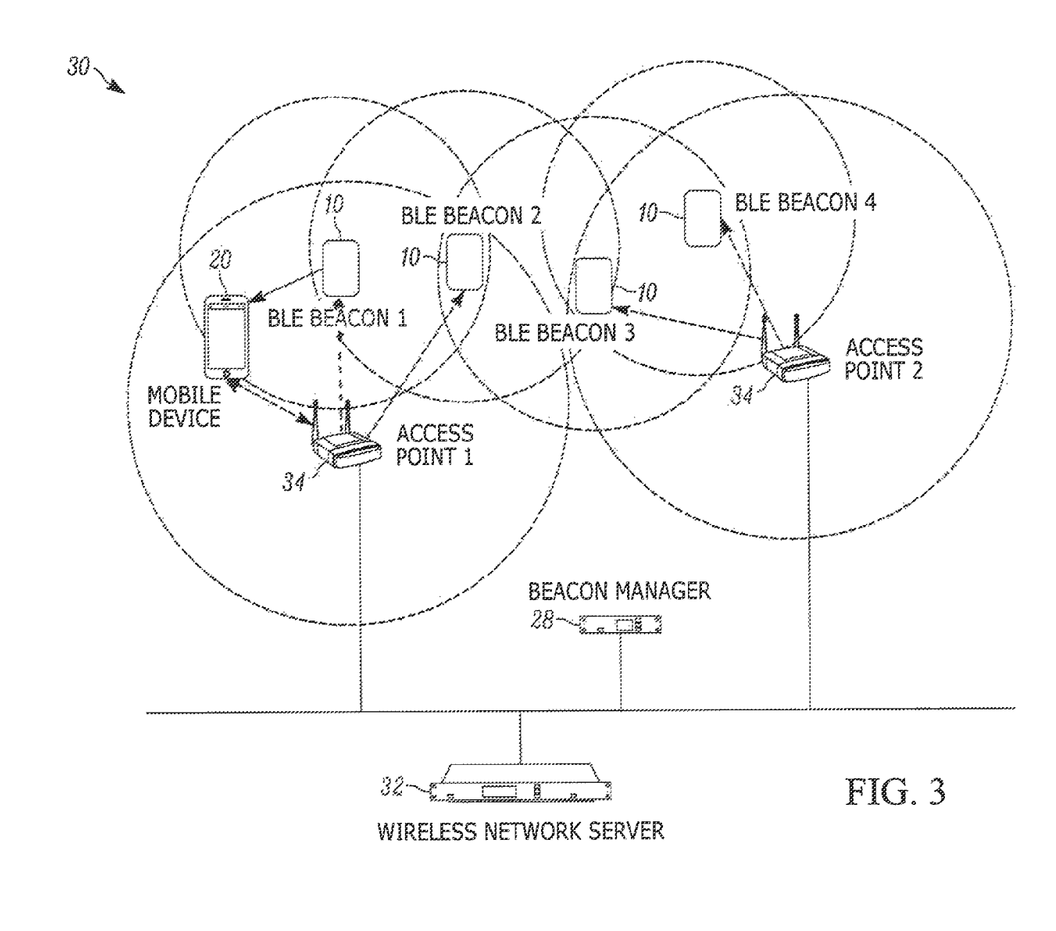
FIG. 3 is a pictorial view of another arrangement for conserving electrical power in a BLE beacon in accordance with this disclosure.

As best shown in FIG. 3, one or more BLE beacons 10 may be deployed in a network 30 that includes a beacon manager 28 and a network controller 32. The network 30 may include one or more infrastructure devices, e.g., access points 34, that connect the wireless devices, e.g., the beacons 10 and the mobile devices 20, to a wired portion of the network 30, e.g., the beacon manager 28 and the network controller 32. Although four beacons 1, 2, 3 and 4 have been illustrated in FIG. 3, it will be understood that any number of beacons can be deployed in the network 30. Although two access points 1 and 2 have been illustrated in FIG. 3, it will be understood that any number of access points can be deployed in the network 30.

As best shown in FIG. 2, the mobile device 20 has a BLE module 36 and a Wi-Fi module 38, both controlled by a programmed microprocessor or device controller 40, and a user interface 42, e.g., a display on the device. Each access point 34 also has a BLE module 44 and a Wi-Fi module 46, both controlled by a programmed microprocessor or infrastructure controller 48. Wi-Fi is a known local area networking wireless technology standard for exchanging data over distances longer than Bluetooth by using radio frequency (RF) waves in the 2.4 GHz and the 5.0 GHz ISM bands. Wi-Fi typically has a range of about 20 meters indoors and more outdoors. The BLE modules 36, 44 communicate with each other over wireless BLE links, and the Wi-Fi modules 38, 46 communicate with each other over wireless Wi-Fi links.

As described above, it is known for the transmitter 14 of each beacon 10 to periodically broadcast a succession of messages over its coverage range, as represented by circles in the drawings. If a mobile device 20 is present in the coverage range, then the device controller 40 of the mobile device 20 processes the message to perform various functions, e.g., to determine the physical location of the mobile device 20 relative to the beacon 10 with a high or fine degree of precision, e.g., from a few meters down to a few centimeters, and/or to precisely track movement of the mobile device 20 in the coverage range, and/or to perform one or more actions or services when the mobile device 20 is in close proximity with, or within one or more predetermined ranges of distances relative to, the beacon 10.

However, no matter whether the mobile device 20 is present or absent in the coverage range, the transmitter 14 of each beacon 10 is in constant operation and is supplied with power from the battery 12. Such periodic transmissions consume and waste electrical power since there is no reason to broadcast any message if there is no mobile device 20 to process the message. Such periodic transmissions therefore reduce the working lifetime of the battery 12. This disclosure is directed to conserving usage of the battery 12 and prolonging its working lifetime.

To that end, the beacon controller 18 controls the beacon to have different operational modes. In a default mode, also known as a power save mode of operation, the beacon controller 18 does not energize the transmitter 14 with power from the battery 12, but only energizes the receiver 16 with power from the battery 12 to periodically listen for a network communication to detect whether or not a mobile device 20 is present in the coverage range. Since the transmitter 14 is deenergized during the power save mode, the power drain on the battery 14 is stopped during this default mode, and the power of the battery is conserved. The periodic rate of energizing the receiver 16 can be adjusted for even more power conservation. Once the receiver 16 receives the network communication indicating that a mobile device 20 is present in the coverage range, then the beacon controller 18 automatically switches from the power save mode to an active mode in which both the transmitter 14 and the receiver 16 are energized.

In FIG. 1, the mobile device 20 itself can emit the network communication on the wireless BLE link 24 to directly alert the beacon 10 to its own presence. In FIG. 2, the infrastructure device, e.g., the illustrated access point 34, can be operated to locate the mobile device 20, or a number of mobile devices 20 in its coverage range, by using its Wi-Fi module 46 with a low or rough degree of precision, and/or by using its BLE module 44 with a higher or finer degree of precision, and can emit the network communication to alert the beacon 10 to the presence of one or more of the mobile devices 20 over a BLE link. The infrastructure device can be any network device that can itself detect the presence of one or more mobile devices 20, or that can receive information concerning the presence of one or more mobile devices 20 from another network device, e.g., an ultrasonic or a radio frequency identification (RFID) locationing system. The access point 34 preferably communicates directly with the beacon 10. The access point 34 is preferably continuously powered via a wired connection to a power source, and preferably has a larger coverage range to detect the mobile device 20 as compared, for example, to the coverage range of the beacon 10. If the access point 34 is periodically powered, then its transmission rate is preferably larger than the transmission rate of the beacon 10. Rather than using its Wi-Fi module 46, the access point 34 may be equipped with a video camera to physically locate the mobile device 20 by detecting the presence of a user holding the mobile device 20. In FIG. 3, another beacon, e.g., beacon 2, can locate the mobile device 20 by using its BLE module, and can emit the network communication to alert the beacon 1 to the presence of the mobile device 20 over a BLE link. Thus, the receiver 16 of beacon 1, for example, can receive the network communication from the other beacon 2, or from the access point 1, or from another mobile device (not illustrated), in a venue.

Once the beacon 10 has been switched to the active mode, the beacon controller 18 returns the beacon 10 to the power save mode when a predetermined condition has been met. For example, the beacon 10 can be returned to the power save mode after the elapse of a predetermined amount of time in which no new mobile device 20 has been detected, or when the number of mobile devices has not changed after a predetermined amount of time, or when instructed to do so by, for example, the access point 34 under the control of the beacon manager 28. For example, in the latter case, the beacon manager 28 can be configured to control the access point 34 to switch all beacons to the power save mode at a certain time, e.g., when a venue closes for the night.

It is advantageous if all the beacons, e.g., beacons 1 and 2 in FIG. 3, in a coverage area, are simultaneously operated, i.e., all simultaneously operated in the default power save mode, or all simultaneously switched to the active mode, or all simultaneously returned to the power save mode, by either having the access point 1 command the beacons 1 and 2 when the mobile device 20 is detected in the range of the access point 1, or by making the current beacon, e.g., beacon 1, control and turn on its neighboring beacon, e.g., beacon 2, when the mobile device 20 is detected in the range of the beacon 1. In the scenario of a customer walking through a retail store, it is desirable for all the beacons in each coverage area to act in unison, rather than waiting for the customer to be in the range of each and every beacon in succession.

Figure 4:
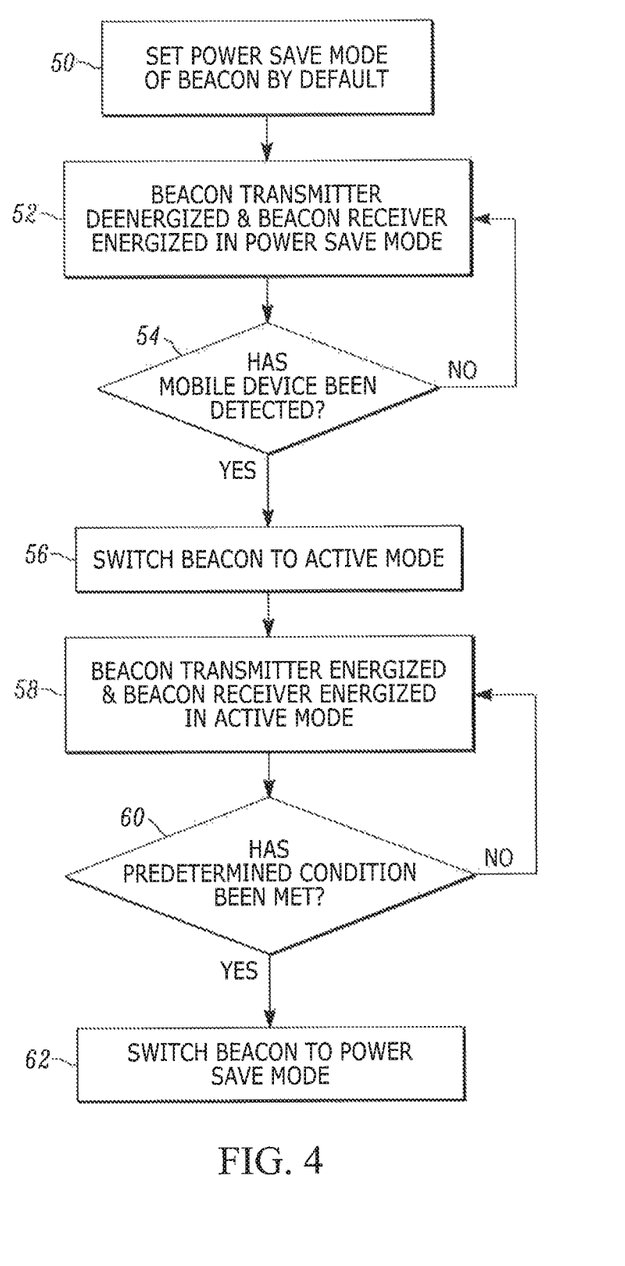
FIG. 4 is a flow chart depicting steps performed in a method of conserving electrical power in a BLE beacon in accordance with this disclosure.

The flowchart of FIG. 4 depicts the steps in performing the method of conserving electrical power in a Bluetooth low energy (BLE) beacon. First the beacon controller 18 sets the power save mode in step 50, in which the transmitter 14 is deenergized to conserve power of the battery 12, and the receiver 16 is energized to listen for a network notification as to whether the presence of a mobile device 20 has been detected in the venue in step 52. If the mobile device 20 has not been detected in step 54, then the beacon remains in the power save mode. If the mobile device 20 has been detected in step 54, then the beacon controller 18 switches the beacon to an active mode, in which both the transmitter 14 and the receiver 16 are energized in step 58. If a predetermined condition has not been met in step 60, then the beacon 10 remains in the active mode. If a predetermined condition has been met in step 60, then the beacon 10 is switched and returned to the power save mode in step 62.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a," or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or arrangement described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for conserving electrical power in a Bluetooth low energy (BLE) network, the BLE network including a plurality of BLE beacons grouped together based on the plurality of BLE beacons covering a coverage area, the arrangement comprising:
 a first one of the plurality of BLE beacons electrically powered by a battery, wherein the first BLE beacon comprises:
  an energizable transmitter configured to periodically broadcast messages when energized; and
  an energizable receiver configured to periodically listen for, and to receive, a network communication indicative of whether a mobile device is present in the coverage area covered by the first plurality of BLE beacons; and
 a beacon controller configured to:
  energize both the transmitter and the receiver with power supplied by the battery during an active mode;
  de-energize the transmitter from receipt of the power supplied by the battery and energize the receiver with the power supplied by the battery during a power save mode; and
  in response to receiving the network communication indicating that the mobile device is present in the coverage area:
   switch from the power save mode to the active mode; and
   send a command to a second one of the plurality of BLE beacons to cause the second one of the plurality of BLE beacons to switch from the power save mode to the active mode.

2. The arrangement of claim 1, wherein the power save mode is a default mode of operation.

3. The arrangement of claim 1, wherein the received network communication is received directly from the mobile device.

4. The arrangement of claim 1, wherein the received network communication is received a third one of the plurality of BLE beacons.

5. The arrangement of claim 1, wherein the received network communication is received from an infrastructure device in the network.

6. The arrangement of claim 1, wherein the received network communication is indicative of a number of mobile devices that are present in the venue.

7. The arrangement of claim 1, wherein the beacon controller is configured to automatically switch from the active mode to the power save mode when a predetermined condition has been met.

8. The arrangement of claim 7, wherein the received network communication is indicative of a number of mobile devices that are present in the venue, and wherein the predetermined condition is one of an elapse of a predetermined amount of time, a non-changing number of the mobile devices after a predetermined amount of time, and a reaching of a predetermined time.

9. The arrangement of claim 1, wherein each of the messages comprises a unique identifier associated with the first BLE beacon, and de-energizing the transmitter prevents the transmitter from periodically broadcasting the unique identifier.

10. A method of conserving electrical power in a Bluetooth low energy (BLE) network, the BLE network including a plurality of BLE beacons grouped together based on the plurality of BLE beacons covering a coverage area, the method comprising:
 electrically powering a first one of the plurality of BLE beacons with a battery;
 during an active mode of operation of the first BLE beacon:
  broadcasting messages by energizing a transmitter of the first BLE beacon to periodically transmit the messages; and
  listening for a network communication indicative of a mobile device being present in coverage area, wherein the listening is performed by energizing a receiver of the first BLE beacon to periodically receive the network communication, wherein both the transmitter and the receiver are energized by power supplied by the battery during the active mode;
 during a power save mode of operation of the first BLE beacon:
  not broadcasting the messages to conserve power from the battery; and
  listening for the network communication, wherein the transmitter is de-energized from receipt of the power supplied by the battery and the receiver is energized with the power supplied by the battery during the power save mode; and
 in response to the network communication being received at the first BLE beacon:
  switching the first BLE beacon from the power save mode to the active mode; and
  sending a command from the first BLE beacon to a second one of the plurality of BLE beacons to cause the second one of the plurality of BLE beacons to switch from the power save mode to the active mode.

11. The method of claim 10, further comprising configuring the power save mode as a default mode of operation.

12. The method of claim 10, further comprising receiving the received network communication directly from the mobile device.

13. The method of claim 10, further comprising receiving the received network communication from a third one of the plurality of BLE beacons.

14. The method of claim 10, further comprising receiving the received network communication from an infrastructure device in the network.

15. The method of claim 10, further comprising receiving the received network communication that is indicative of a number of mobile devices that are present in the venue.

16. The method of claim 10, further comprising automatically switching from the active mode to the power save mode when a predetermined condition has been met.

17. The method of claim 16, further comprising receiving the received network communication that is indicative of a number of mobile devices that are present in the venue, and configuring the predetermined condition as one of an elapse of a predetermined amount of time, a non-changing number of the mobile devices after a predetermined amount of time, and a reaching of a predetermined time.

18. The method of claim 10, wherein each of the messages comprises a unique identifier associated with the first BLE beacon, and de-energizing the transmit prevents the transmitter from periodically broadcasting the unique identifier.

* * * * *